US012560097B2

(12) United States Patent
Fang et al.

(10) Patent No.: US 12,560,097 B2
(45) Date of Patent: Feb. 24, 2026

(54) APPARATUS TO PREVENT AIR LEAKAGE IN TURBINE ENGINES

(71) Applicant: General Electric Company, Schenectady, NY (US)

(72) Inventors: Ning Fang, West Chester, OH (US); William Bowden, Evendale, OH (US); Weili Yang, West Chester, OH (US); Keith E. Blodgett, Evendale, OH (US); Guohua Zhong, Shanghai (CN); Niloufar Hosseiny, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/621,779

(22) Filed: Mar. 29, 2024

(65) Prior Publication Data

US 2024/0328324 A1 Oct. 3, 2024

(30) Foreign Application Priority Data

Mar. 31, 2023 (CN) .......................... 202310336136.9

(51) Int. Cl.
| | |
|---|---|
| *F01D 11/00* | (2006.01) |
| *F01D 25/24* | (2006.01) |
| *F02C 7/28* | (2006.01) |
| *F02K 1/80* | (2006.01) |

(52) U.S. Cl.
CPC ............ *F01D 11/005* (2013.01); *F01D 25/24* (2013.01); *F02C 7/28* (2013.01); *F02K 1/805* (2013.01); *F05D 2220/323* (2013.01); *F05D 2240/56* (2013.01)

(58) Field of Classification Search
CPC ........ F01D 11/00; F01D 11/005; F01D 25/24; F02C 7/28; F02K 1/80; F02K 1/805; F05D 2240/56
See application file for complete search history.

(56) References Cited

U.S. PATENT DOCUMENTS

| | | | |
|---|---|---|---|
| 3,814,325 A | 6/1974 | Mc et al. | |
| 5,170,964 A | 12/1992 | Enderle et al. | |
| 8,595,981 B2 | 12/2013 | Lahnala | |
| 8,915,060 B2 | 12/2014 | Parham | |
| 9,759,087 B2 * | 9/2017 | Amkraut ................... | F02K 1/09 |
| 10,208,674 B2 * | 2/2019 | Lutjen ................... | F16J 15/328 |
| 10,487,678 B2 * | 11/2019 | Tyler, Jr. ................. | F01D 11/08 |

(Continued)

FOREIGN PATENT DOCUMENTS

| | | |
|---|---|---|
| DE | 3446150 A1 | 7/1985 |
| EP | 3441557 A1 | 2/2019 |
| FR | 2988129 A1 | 9/2013 |

*Primary Examiner* — Brian P Wolcott

(74) *Attorney, Agent, or Firm* — Dority & Manning, P.A.

(57) ABSTRACT

Apparatus are disclosed for a turbofan comprising: a bifurcation including a first track; and an outer casing including an airflow inlet and an airflow outlet, the outer casing adjustable into a closed position and an open position, the outer casing positioned around the bifurcation, the outer casing including a first slider for movement between the closed position and the open position that mates with the first track, the first track including a brush seal holder and a brush seal including a plurality of bristles having a compressed state in the closed position and a decompressed state in the open position.

20 Claims, 13 Drawing Sheets

(56) References Cited

U.S. PATENT DOCUMENTS

| | | | |
|---|---|---|---|
| 11,390,393 B2 | 7/2022 | Cochran | |
| 11,492,832 B2 * | 11/2022 | Hernandez | E06B 1/70 |
| 2010/0095650 A1 * | 4/2010 | Schafer | F02K 1/15 |
| | | | 60/226.3 |

* cited by examiner

APPARATUS TO PREVENT AIR LEAKAGE IN TURBINE ENGINES

RELATED APPLICATIONS

This patent claims the benefit of priority to Chinese Patent application Ser. No. 202310336136.9, filed on Mar. 31, 2023. Chinese Patent Application No. 202310336136.9 is hereby incorporated herein by reference in its entirety.

FIELD OF THE DISCLOSURE

This disclosure relates generally to turbine engines and, more particularly, to an apparatus to prevent air leakage in turbine engines and nacelles.

BACKGROUND

A turbine engine generally includes, in serial flow order, an inlet section, a compressor section, a combustion section, a turbine section, and an exhaust section cased within a nacelle. In operation, air enters the inlet section and flows to the compressor section where one or more axial compressors progressively compress the air until it reaches the combustion section. Frequently, the nacelle architecture includes access for maintenance and tracks for translating a portion of the nacelle during reverse thrust operation upon landing. Without adequate sealing, significant air leakage across the nacelle can occur. Sealing can eliminate most leakage, but rarely all of it. Some nacelle architectures may be more challenging for sealing off leakage. Due to the leakage, significant performance loss occurs during operation.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

Figure 1:
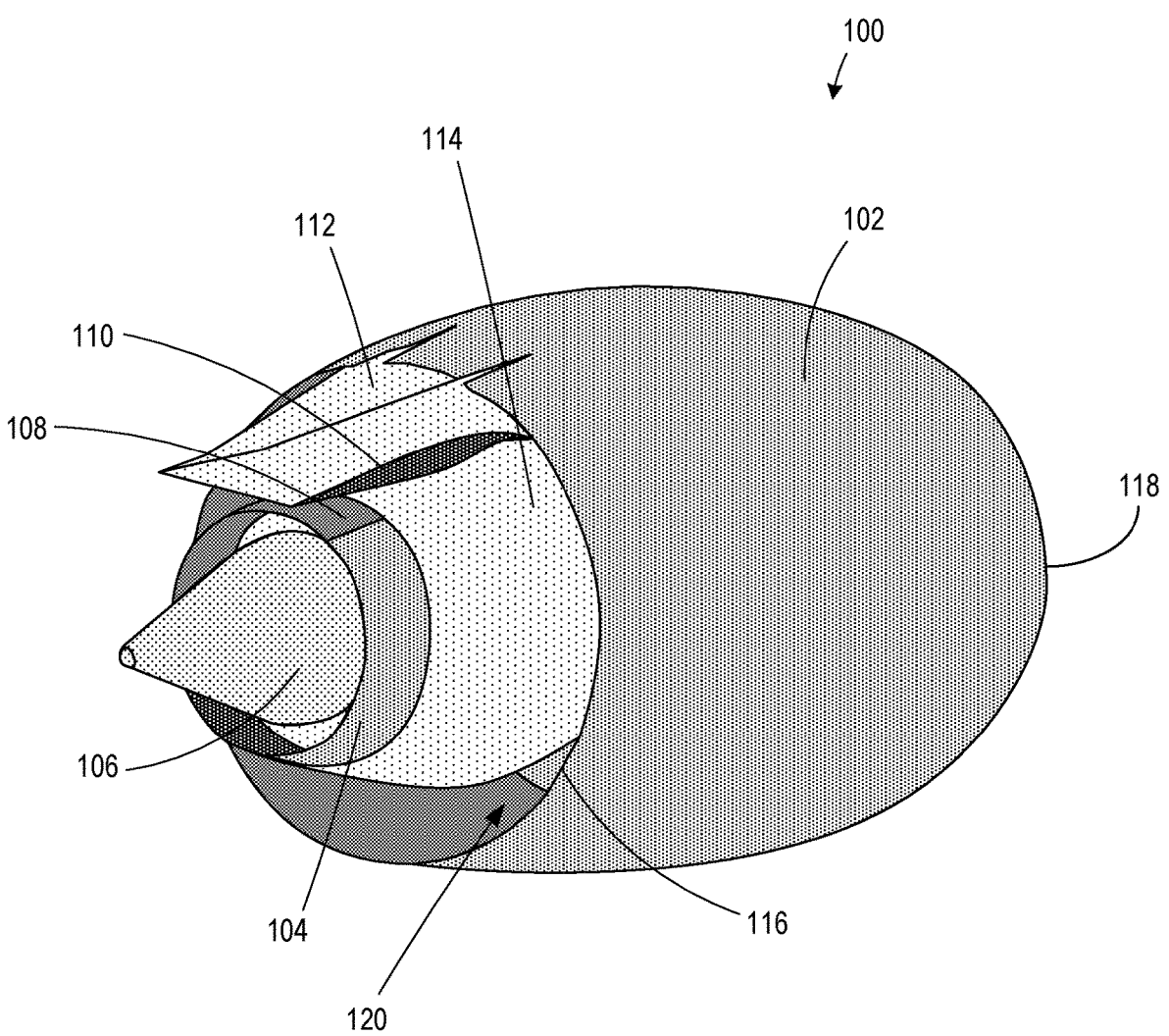
FIG. 1 illustrates an example nacelle for a turbofan-type gas turbine engine, according to one or more examples shown and described herein.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Performance of gas turbine engines used on aircrafts (e.g., commercial aircraft) varies due to different casing architectures (e.g., thrust reverser, D-Ducts, C-Ducts, O-Ducts, translating, rotating, fixed cascade designs, doorless reversers, etc.) and air leakage across the casing architecture. Casing leakages have caused significant performance losses of modern aircraft engines. Preventing air leakages across ducts in nacelles has been a key effort for casing design. However, prior casing design strategies have fallen short and continue to allow significant leakage.

Most turbine engine casings are D-Duct styles that can be closed and opened with hinges by the pylon and latches on the opposing side. However, with more compact casing designs, translating nacelles have been introduced to offer improvements. Translating nacelles cannot use traditional compressed elastic contact seals to prevent leakage. Under this circumstance, air leakages cause performance penalties. To combat this challenge of air leakage with translating nacelles, certain examples provide brush seals. A brush seal acts as a durable sealant due to compressibility of its bristles, for example. Thus, implementing brush seals with bristles closes or seals air leakage paths and accommodates relative motion of the translation of the nacelle. Furthermore, the brush seals do not require a traditional perpendicular compression to seal the path. Preventing air leakage across casing architectures improves the performance of the gas turbine engine and, thus, saves energy by reducing the amount of gas consumption.

Figure 4A:
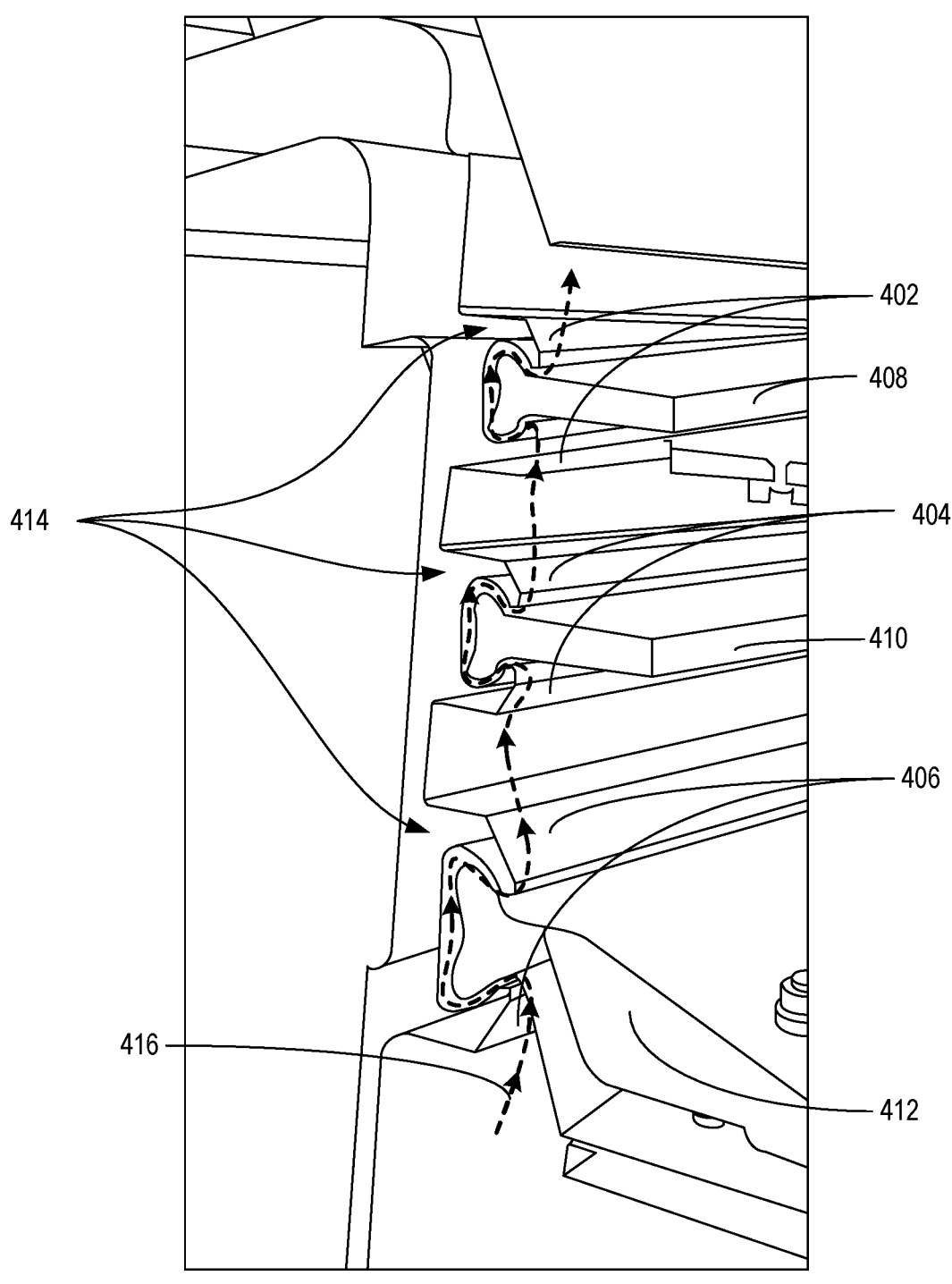
FIG. 4A illustrates tracks with sliders and air leakage around the tracks, according to one or more examples shown and described herein.

As used herein, air leakage (e.g., airflow leakage) may be overboard or domestic. Overboard air leakage (e.g., overboard airflow leakage) is defined as airflow leaking from a first region within the turbofan casing under high pressure to a second region outside the turbine engine casing under ambient conditions. For example, gaps around the tracks described in FIG. 4A are instances of overboard air leakage. Domestic air leakage (e.g., domestic airflow leakage) is defined as airflow leaking from a zone of the engine to a second zone of the engine. For example, airflow leaking from a fan bypass stream to a core compartment covered by a core cowl are instances of domestic air leakage.

The turbine engine, as used herein, is a gas turbine engine that uses its exhaust to create thrust. A modern variation of the gas turbine engine is a turbofan-type gas engine, as used herein, is defined as a core engine surrounded by a fan in the front and an additional turbine in the rear. Although the examples described herein focuses on the turbofan-type as engine, the brush seals may be implemented in all turbine engines.

Figure 2:
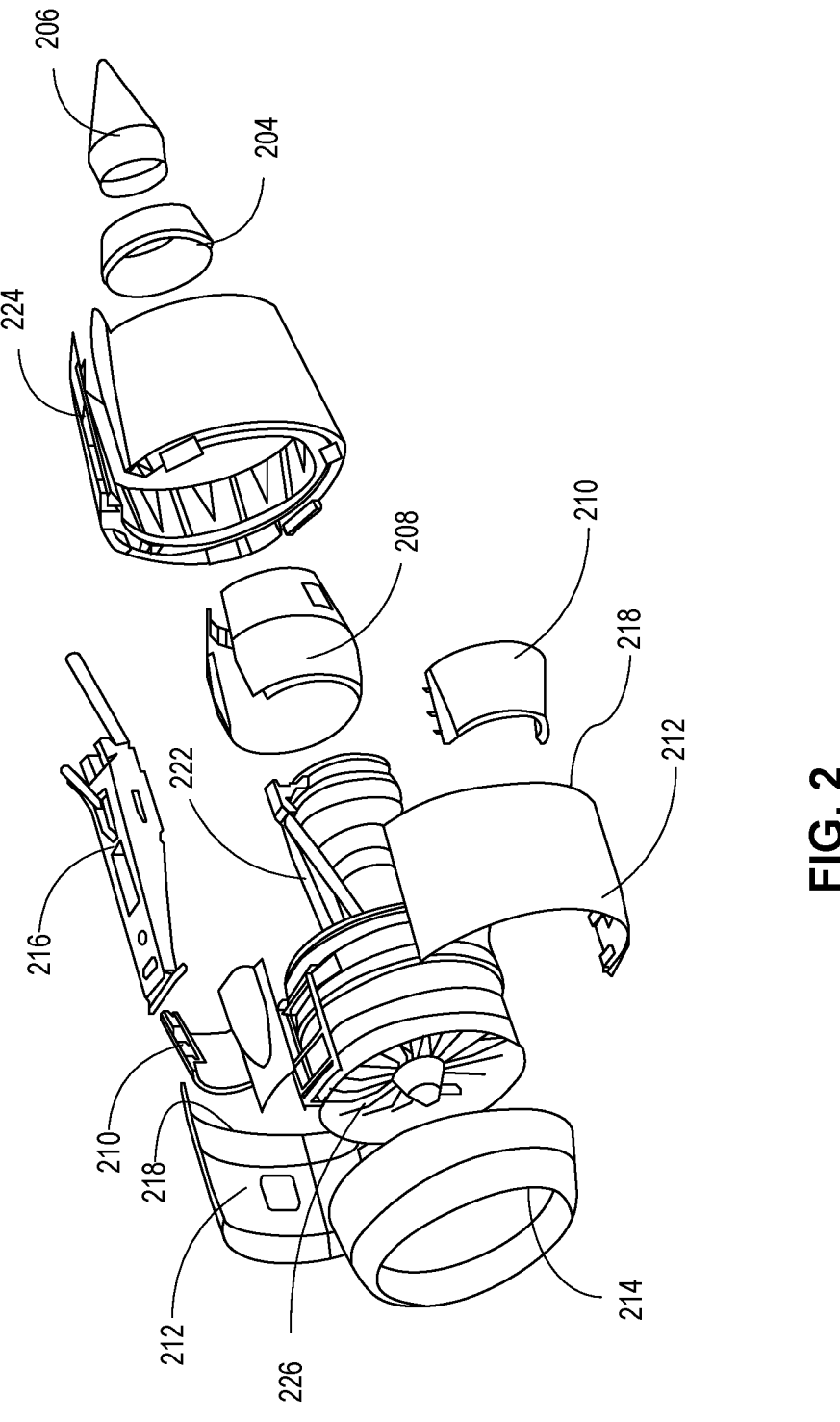
FIG. 2 illustrates an exploded view of FIG. 1.

FIG. 1 illustrates an example nacelle (e.g., also referred to herein as an outer casing and/or outer duct) for a turbofan-type gas turbine engine 100 ("turbofan 100") as may incorporate various examples disclosed herein. In general, the turbofan 100 can include a core turbine or gas turbine engine disposed downstream from a fan section. An annular fan casing or nacelle 102 circumferentially encloses a fan section 226, as shown in FIG. 2, and/or at least a portion of a core turbine 222, as shown in FIG. 2. An airflow outlet section 116 of the nacelle 102, shown in FIG. 1, can enclose an outer casing (e.g., portion of the outer casing) of the core turbine 222, as shown in FIG. 2, to define a bypass airflow passage therebetween. During operation, air is forced through an airflow inlet section 118 of the nacelle 102 and discharged through the airflow outlet section 116. The example nacelle 102 encloses a core cowl 114 and an aft core cowl 104, which both together enclose a plug 106 (also referred herein as a tailcone) of the core turbine 222, as shown in FIG. 2. In some examples, the nacelle 102 includes an aft pylon fairing 112, a bump fairing 110, and a batwing fairing 108. In some instances, a void between the nacelle 102 and the core cowl 114 is referred to as a thrust reverser cavity 120 (also referred herein as a pressure shelf).

FIG. 2 illustrates an exploded view of the nacelle 102 of FIG. 1 and one example turbofan casing architecture in which brush seals are implemented. In some examples, the nacelle 102 includes a first nacelle section (e.g., first outer duct section) 212 and a thrust reverser (e.g., a second outer duct section, second nacelle section, etc.) 224, as shown in FIG. 2. The first nacelle section 212 includes a first perimeter 218. In general, air enters an airflow inlet section 214 and is pulled through the fan section 226 which is housed in a first nacelle section 212. Downstream of the fan section 226, the air is directed through the core turbine 222, which is housed within a forward core cowl 210. In some examples, an aft core cowl 204 and a plug 206 are connected to the end of the core turbine 222 to provide aerodynamic closure and reduce turbulence in the airflow. Further, the plug 206 restricts the opening of the outlet of the exhaust nozzle to form a convergent duct, in which the exhaust airflow is restricted to a smaller outlet opening, thus, providing increased thrust. In some examples, the forward core cowl 210 includes hinges (e.g., latches, etc.) (not shown in this view) to allow the casing to be opened for maintenance of the core turbine 222. Further, a core cowl 208 encloses the forward core cowl 210 to provide a cover for the core compartment equipment and seals the engine. Furthermore, the core cowl 208 surrounds the engine. In some examples, the core cowl 208 translates (e.g., moves, adjust, etc.) between an open and closed position, to allow for performing maintenance. In some examples, the core cowl 208 (e.g., translating duct) is movable longitudinally between an open and closed position. Furthermore, an example thrust reverser 224 encloses the core cowl 208. The thrust reverser 224 is a duct of a particular shape (e.g., translating O-duct, D-Duct, C-Duct, etc.) used to change the direction of the airflow, through certain duct movements, in the nacelle 102 shown in FIG. 1. In some examples, the thrust reverser 224 is used to reduce the landing distance of an aircraft by reversing the direction of an exhaust gas stream. In some instances, a movable O-duct can be used as the thrust reverser 224. In some examples, the movable O-duct slides on a track(s) for reverse thrust operations. For example, the reverse thrust may be used during the deceleration of an aircraft after landing. Thrust is projected in the opposite direction to normal. In some examples, the reverse thrust operation may be used during flight.

An open position is defined as a position at which the thrust reverser 224 allows deceleration of the aircraft (e.g., redirecting from the airflow outlet section 116 (shown in FIG. 1) and instead through the mid-section of the nacelle 102) or provides access to an interior of the turbine engine for maintenance. A closed position is defined as a position at which the thrust reverser 224 is stowed during normal flight operation (e.g., during acceleration or constant speed during air flight) where the airflow through the nacelle 102 is directed through the airflow outlet section 116. Thus, in the closed position, air leakage decreases the performance of the turbine because air is escaping through the core cowl 208 and the thrust reverser 224. Therefore, less air is being expelled around the plug 206, reducing the forward thrust.

As shown in FIG. 2, in some examples, an aft pylon fairing 216 connects to the first nacelle section 212 and the example thrust reverser 224. In some examples, the aft pylon fairing 216 is further used to attach the turbofan 100, as shown in FIG. 1, to a wing of an aircraft. In some instances, the aft pylon fairing 216 includes tracks. While tracks are not visible in the view of FIG. 2, example tracks are shown in FIGS. 4A-B, 5, and 7-9.

Figure 3A:
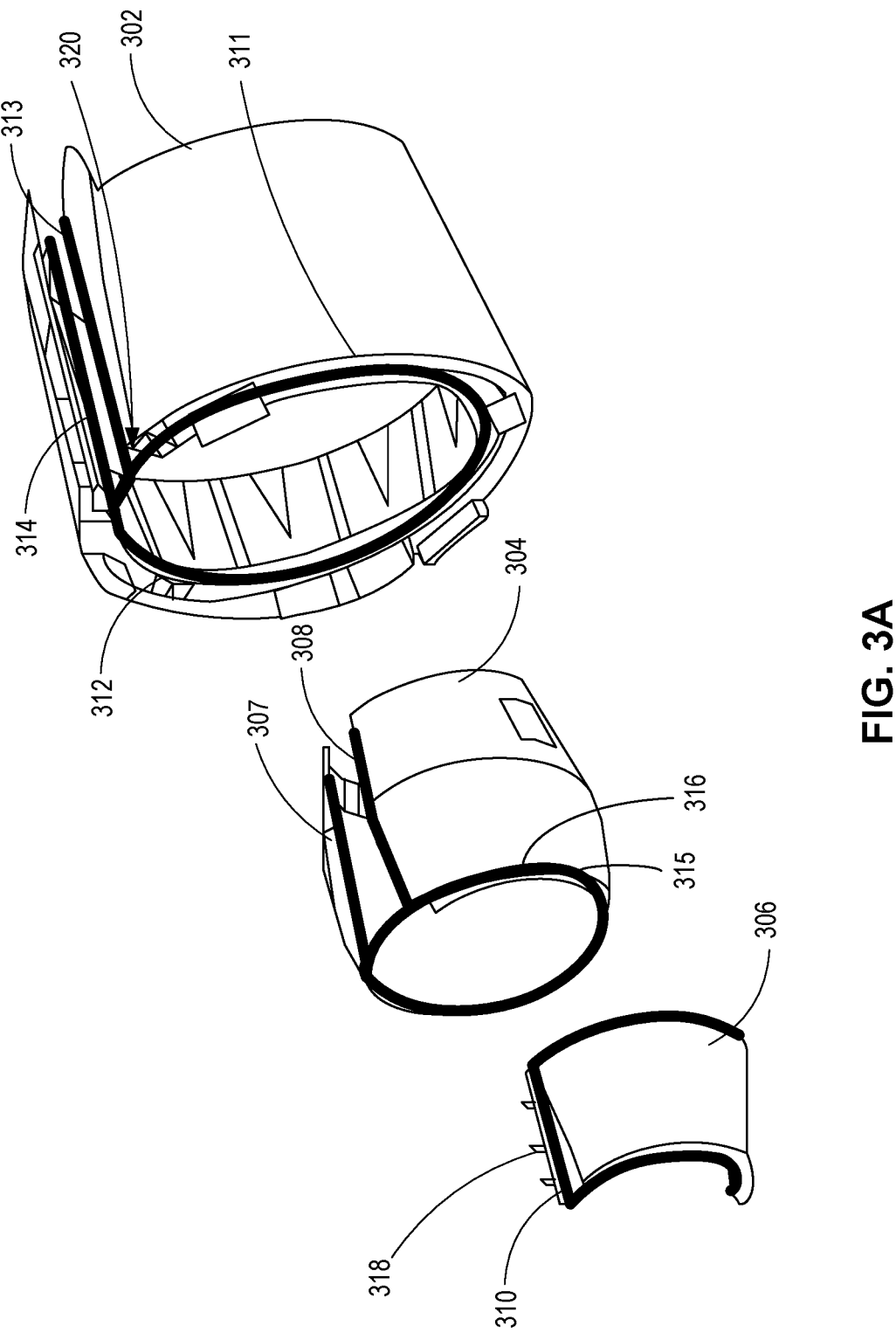
FIG. 3A illustrates an example thrust reverser, core cowl, and translating core cowl with example arrangement of brush seal locations, according to one or more examples shown and described herein.

FIG. 3A illustrates an example thrust reverser (e.g., second nacelle section) 302, a core cowl 304, and a forward core cowl 306 with an example arrangement of brush seal locations. In some examples, the thrust reverser 302 corresponds to the thrust reverser 224, shown in FIG. 2. As shown in FIG. 3A, the thrust reverser 302 includes a first brush seal arrangement 312 and a second brush seal arrangement 314. The first brush seal arrangement 312 encompasses an O-ring 311 of the thrust reverser 302. The second brush seal arrangement 314 is located within tracks 313 of the thrust reverser 302, where the aft pylon fairing 216 of FIG. 2 is connected. In some instances, the second brush seal arrangement 314 is located radially outward of the tracks 313. In some examples, the O-ring 311 and the tracks 313 define a second perimeter 320. In some examples, the thrust reverser 302 includes both the first brush seal arrangement 312 and the second brush seal arrangement 314. In other examples, the thrust reverser 302 includes the first brush seal arrangement 312 or the second brush seal arrangement 314.

As shown in FIG. 3A, the core cowl 304 includes a third brush seal arrangement 316 and a fourth brush seal arrangement 308. The third brush seal arrangement 316 encompasses an O-ring 315 of the core cowl 304. The fourth brush seal arrangement 308 is located within tracks 307 of the core cowl 304. In some examples, the fourth brush seal arrangement 308 is located between sliders on the core cowl 304. While sliders are not visible in the view of FIG. 3A, example sliders are shown in FIGS. 4B and 7-9. In some examples, the core cowl 304 includes both the third brush seal arrangement 316 and the fourth brush seal arrangement 308. In other examples, the core cowl 304 includes the third brush seal arrangement 316 or the fourth brush seal arrangement 308.

Further, FIG. 3A illustrates the forward core cowl 306 with a fifth brush seal arrangement 310. As illustrated in FIG. 3A, the fifth brush seal arrangement 310 is located along an entirety of an edge (e.g., perimeter) of the forward core cowl 306. FIG. 3A illustrates a left section of the forward core cowl 306. In some examples, a right section of the forward core cowl 306 also includes brush seals. In some instances, the right section of the forward core cowl 306 mirrors the fifth brush seal arrangement 310. In some examples, the forward core cowl 306 includes brush seals which partially cover the edge of the forward core cowl 306. For example, brush seals are located around the O-ring upstream or downstream of the forward core cowl 306. In other examples, brush seals are located at a hinge (e.g., latch, fastener, bolt, lock, etc.) 318.

As shown in FIG. 3A, the first, second, third, fourth, or fifth brush seal arrangements 312, 314, 316, 308, 310 may be included in the turbofan 100, shown in FIG. 1. In some examples, at least one of the first, second, third, fourth, or fifth brush seal arrangements 312, 314, 316, 308, 310, shown in FIG. 3A, are included in the turbofan 100, shown in FIG. 1. In other examples, brush seals are included in locations of air leakage anywhere throughout the turbofan 100. In some examples, brush seals can be implemented in lieu of or in combination with existing seals (e.g., a bulb seal, a P-shaped seal and/or P-profile seal (as defined herein P-seal), a labyrinth seal, a compression seal, etc.).

Figure 3B:
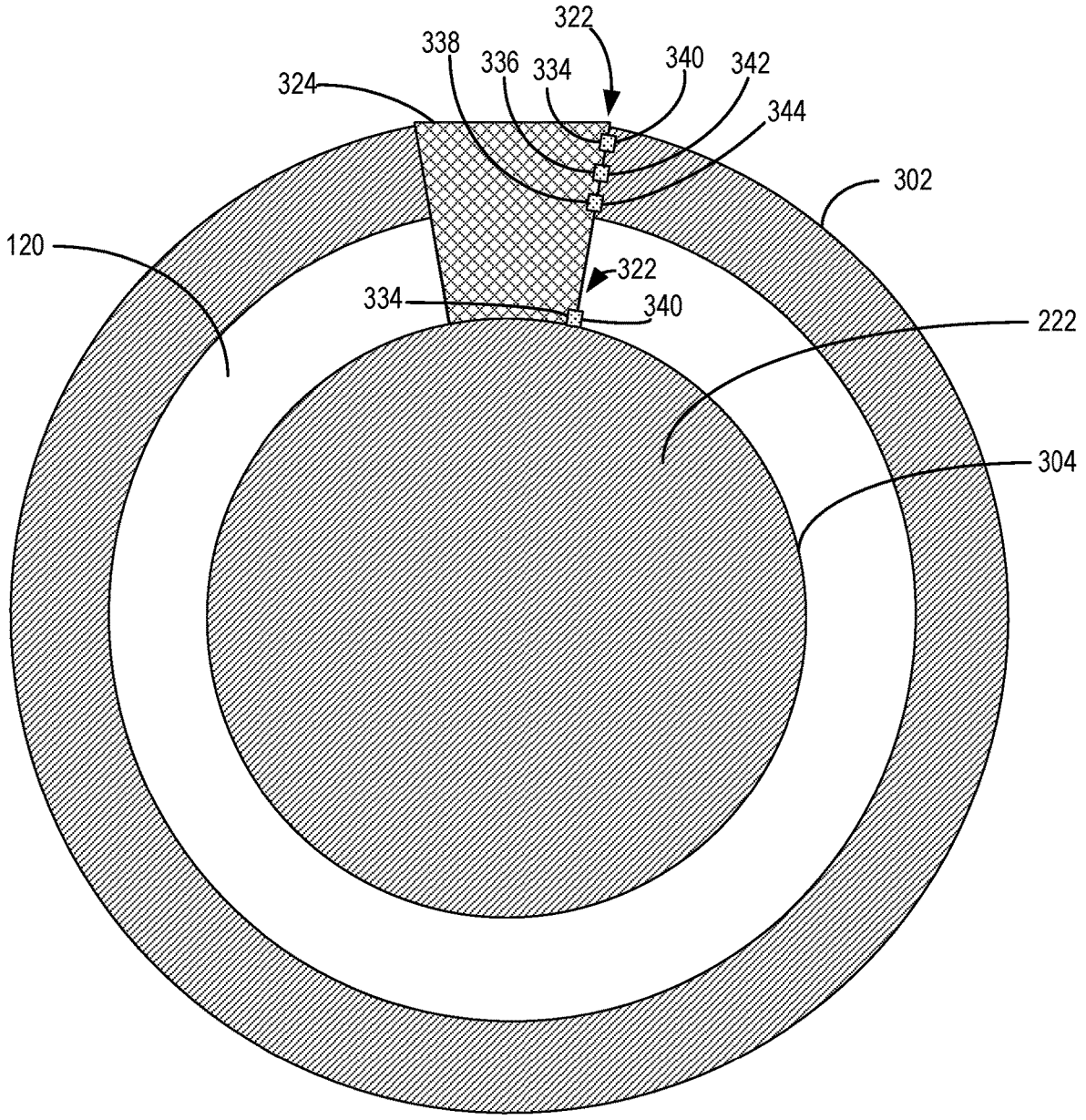
FIG. 3B illustrates a cross-sectional view of the turbofan 100, according to one or more examples shown and described herein.

FIG. 3B illustrates a cross-sectional view of the turbofan 100. As mentioned previously, the thrust reverser 302 surrounds the core cowl 304, which surrounds the core turbine 222. In some examples, the thrust reverser cavity 120 corresponds to a bypass airflow passage 1340, shown in FIG. 13. FIG. 3B further includes an upper bifurcation 324. The upper bifurcation 324 is a conduit between the thrust reverser 302 and the core cowl 304. In some examples, the turbofan 100 (shown in FIG. 1) includes the upper bifurcation 324 and a lower bifurcation (not shown in this view). The upper bifurcation 324 and the lower bifurcation include interior space for fuel lines, hydraulic line, electrical lines, communication links, tracks, and sliders. In this example, a track and slider assembly 322 is located between the thrust reverser 302 and the upper bifurcation 324. In the example of FIG. 3B, the track and slider assembly 322 includes three tracks 334, 336, 338 and three sliders 340, 342, 344. Similarly, tracks 402, 404, 406 and sliders 408, 410, 412 are shown in FIG. 4A below. However, the example track and slider assembly 322 should not be limited to three tracks 334, 336, 338 and sliders 340, 342, 344. In some examples, the track and slider assembly 322, includes more than three example tracks 334, 336, 338 mated to example sliders 340, 342, 344. In other instances, the track and slider assembly 322 includes one or two example tracks 334, 336, 338 and mated example sliders 340, 342, 344. In some examples, the tracks 334, 336, 338 are located on the upper bifurcation 324 and mated with sliders 340, 342, 344 located on the thrust reverser 302. In other instances, the tracks 334, 336, 338 are located on the thrust reverser 302 and mated with sliders 340, 342, 344 located on the upper bifurcation 324. In some examples, the track and slider assembly 322 is located between the core cowl 304 and the upper bifurcation 324.

Figure 3C:
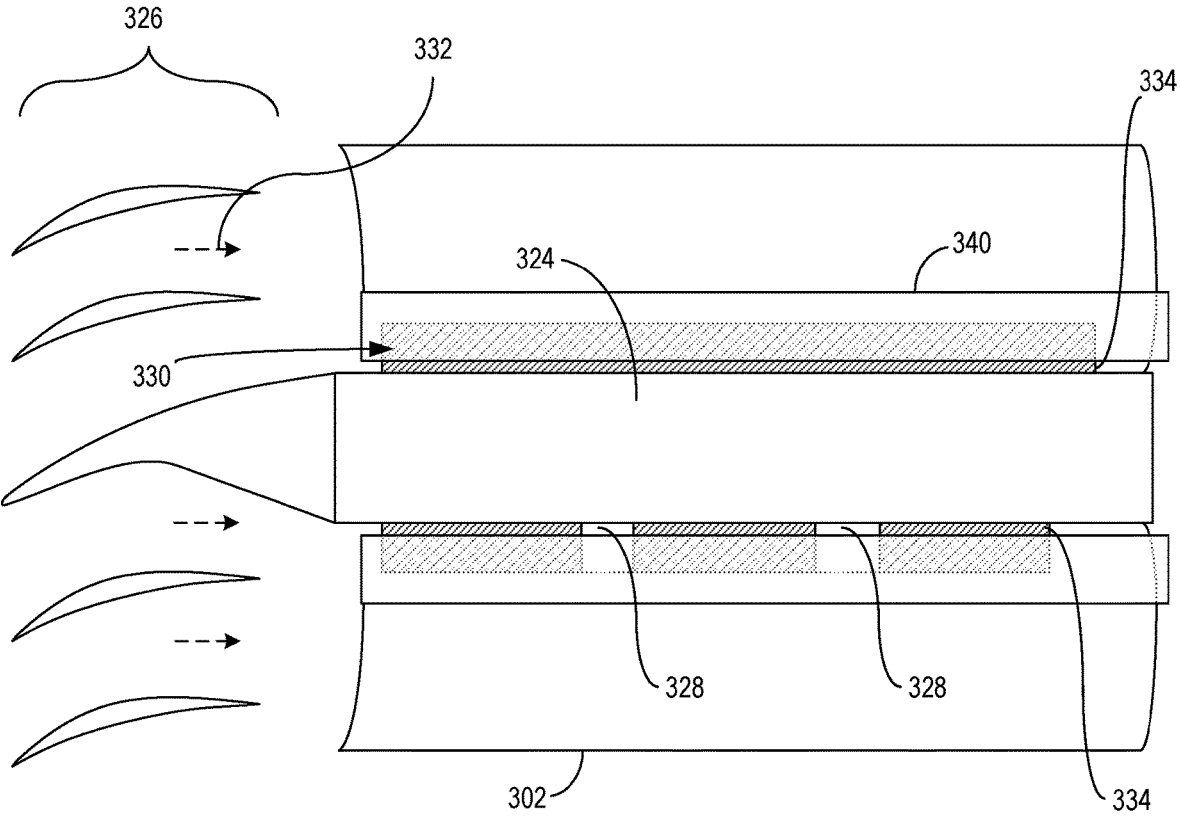
FIG. 3C illustrates a top view of an upper bifurcation on an example thrust reverser, according to one or more examples shown and described herein.

FIG. 3C illustrates a top view of the upper bifurcation 324 on the thrust reverser 302. The upper bifurcation 324 and the lower bifurcation are within a bypass flow path 332. In some examples, the bypass flow path 332 corresponds to bypass airflow passage 1340, shown in FIG. 13. Upstream of the upper bifurcation 324 are vanes 326 that help remove fan swirl and guide airflow efficiently throughout the thrust reverser cavity 120 (shown in FIGS. 1 and 3B). In some examples, the vanes 326 correspond to outlet guide vanes 1336 shown in FIG. 13. In this example, the thrust reverser 302 includes the sliders 340, 342, 344, although, the sliders 342, 344 are not visible in FIG. 3C because they are concealed by the slider 340. The upper bifurcation 324 includes the tracks 334, 336, 338, although, the tracks 336, 338 are not visible in FIG. 3C because they are concealed by the track 334. In some examples, the tracks 334, 336, 338 include voids 328 intermittently spaces throughout the tracks 334, 336, 338. The voids 328 receive brush seal holders assemblies 1000 and/or 1100, shown in FIGS. 10 and 11, respectively. In other examples, the brush seal holder assemblies 1000 and/or 1100 are included at a location 330 between the slider 340 and the track 334, shown in FIG. 4B in more detail. In some examples, the brush seal holder assemblies 1000 and/or 1100 are located intermittently throughout the track and slider assembly 322 (shown in FIG. 3B).

Figure 4B:
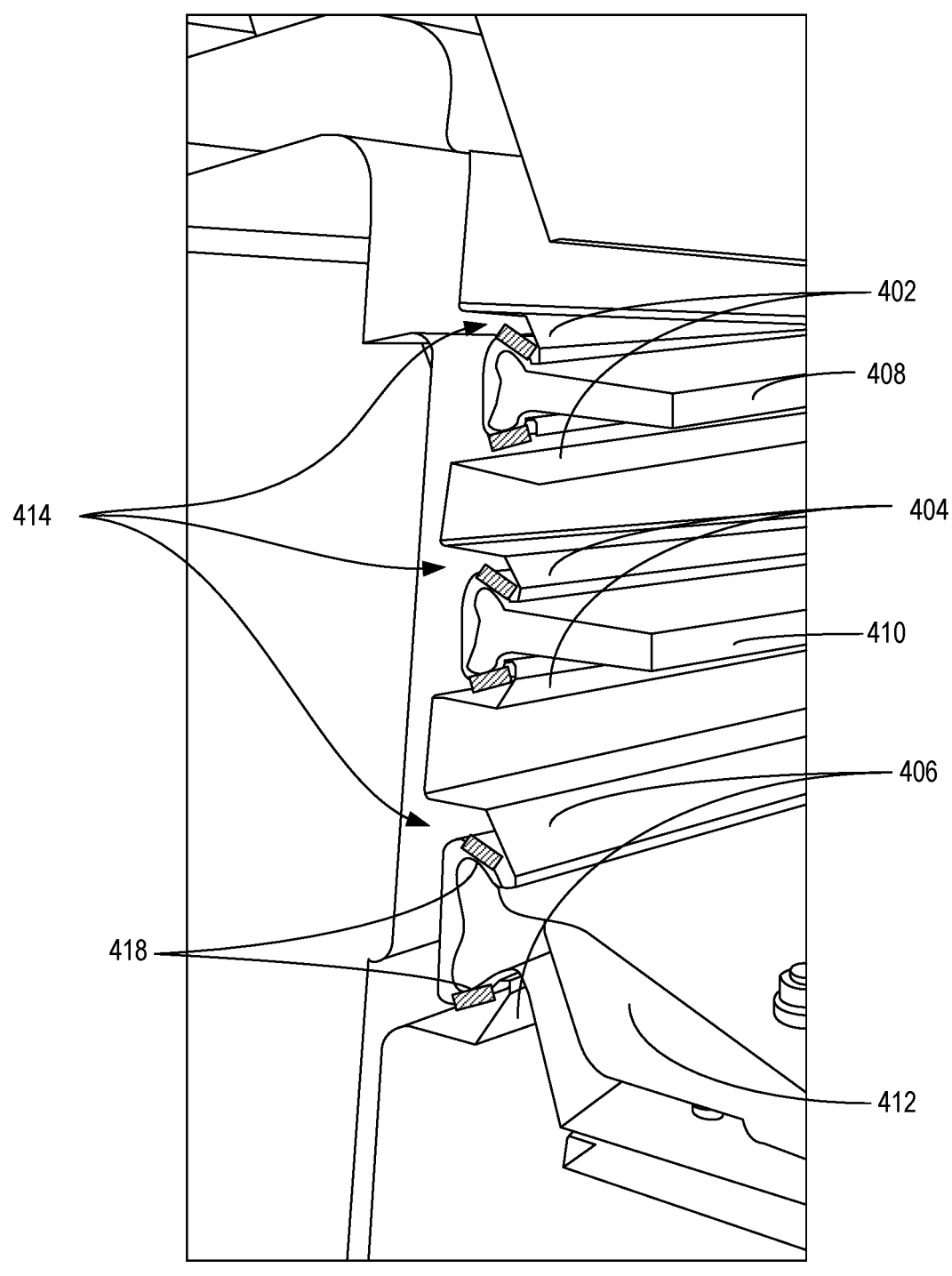
FIG. 4B illustrates example tracks with sliders with example brush seals, according to one or more examples shown and described herein.

FIG. 4A illustrates sliders 408, 410, 412 and tracks 402, 404, 406 with air leakage around the tracks 402, 404, 406. The thrust reverser 224, shown in FIG. 2, deploys (e.g., translates open) by sliding the thrust reverser 224 along the tracks 402, 404, 406 (e.g., slider tracks and/or translating tracks). To provide for deployment of the thrust reverser 224, the core cowl 208, shown in FIG. 2, the aft pylon fairing 216, shown in FIG. 2, or the upper bifurcation 324, shown in FIG. 3B, includes sliders 408, 410, 412, shown in FIG. 4A, which slide (e.g., move, translate, etc.) in and along the tracks 402, 404, 406. In other instances, to provide for deployment of the thrust reverser 224, the core cowl 208, the aft pylon fairing 216, or the upper bifurcation 324 includes tracks 402, 404, 406 that the sliders 408, 410, 412, included on the thrust reverser 224, slide (e.g., move, translate, etc.) in and along. When the thrust reverser 224 is in the deployed position, bypass air flows from the fan section 226, shown in FIG. 2, and is directed forward, in return creating reverse thrust. As mentioned previously, in some examples, the reverse thrust, in operation, decelerates the aircraft after landing. When the thrust reverser 224 is in a stowed position, gaps are formed around the tracks 402, 404, 406 by operation loads, wind-up loads, steady-state fatigue or limit loads, and thermal expansion and contraction of components which cause non-uniform spacing/connections between hardware and/or movable components, such as, tracks and sliders and/or pivot doors, and create an air leakage 416 opportunity. Furthermore, FIG. 4A illustrates an example of the sliders 408, 410, 412 ride, slide, move, and/or translate along the inside of the example tracks 402, 404, 406. In some examples, the inside of the tracks 402, 404, 406 is referred to as track sleeves 414. In some examples, brush seals 418, are implemented between the example tracks 402, 404, 406, as shown in FIG. 4B. As shown in the FIG. 4A, the three example tracks 402, 404, 406 are mated with the three example sliders 408, 410, 412, however, the example should not be limited to three. In some examples, the example thrust reverser 224, shown in FIG. 2, includes more than three example tracks 402, 404, 406 and mated example sliders 408, 410, 412. In other instances, the example thrust reverser 224 includes one or two example tracks 402, 404, 406 and mated example sliders 408, 410, 412.

FIG. 4B illustrates sliders 408, 410, 412 and tracks 402, 404, 406 with brush seals 418 to prevent the air leakage 416 (shown in FIG. 4A) around the tracks 402, 404, 406. In some examples, the brush seals 418 are implemented between the example tracks 402, 404, 406 and the example sliders 408, 410, 412. In some examples, two brush seals 418 are located on both sides of the sliders 408, 410, 412, as shown in FIG. 4B. In other instances, the brush seals are included on one side of the sliders 408, 410, 412. In some examples, the brush seals 418 are included intermittently from a first end of the tracks 402, 404, 406 to a second end of the tracks 402, 404, 406.

Figure 5:
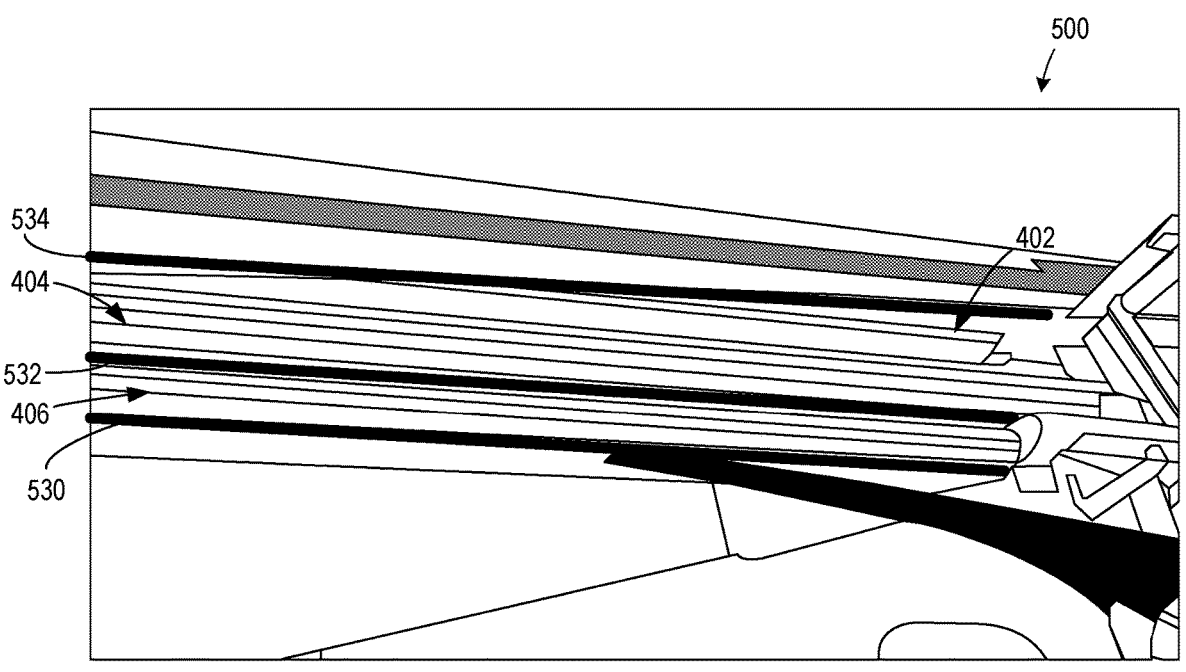
FIG. 5 illustrates an example tracks with an example arrangement of brush seal locations, according to one or more examples shown and described herein.

FIG. 5 illustrates an example brush seal configuration 500 to stop air leakage 416 (shown in FIG. 4A) through the gaps formed around the tracks 402, 404, 406. The brush seals 530, 532, 534 are located within the air leakage 416 flow path. The brush seal configuration illustrated by brush seals 530, 532, 534 is one example brush seal configuration 500 to stop the air leakage 416. The brush seals 530, 532, 534 create a seal between tracks 402, 404, 406 (e.g., slider tracks and/or translating tracks). In FIG. 5, the brush seal configuration 500 includes three rows of brush seals 530, 532, 534. However, in some examples, the brush seal configuration 500 includes only one or two rows of brush seals 530, 532, 534. In other examples, the brush seal configuration 500 includes more than three rows of brush seals 530, 532, 534. The additional rows of brush seals 530, 532, 534 produce a better seal with redundancy to stop air leakage 416 (shown in FIG. 4A through the gaps, for example.

Figure 6A:
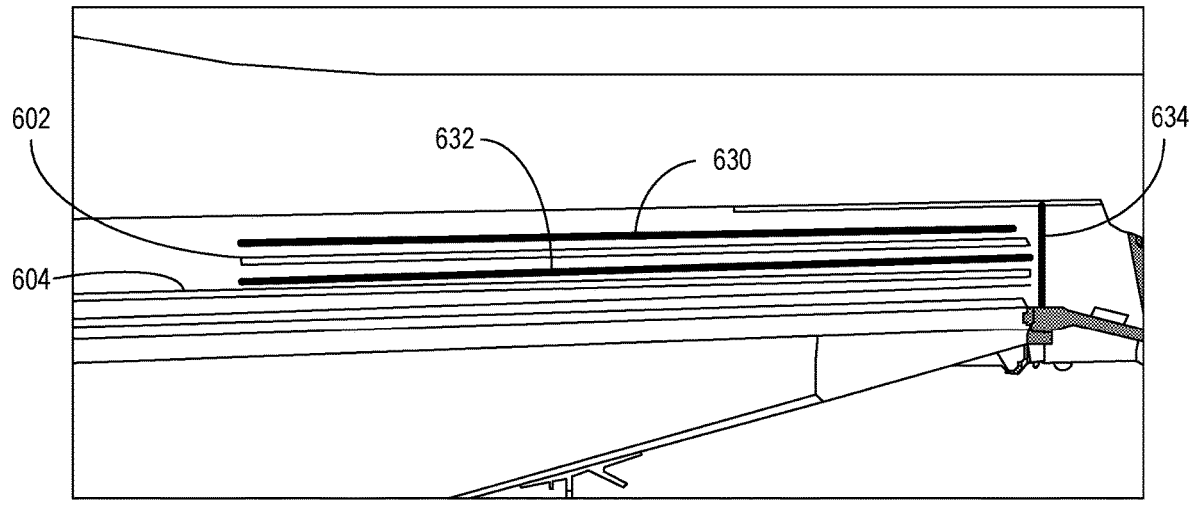
FIG. 6A illustrates another example of tracks with an example arrangement of brush seal locations, according to one or more examples shown and described herein.

FIG. 6A shows another example of translating tracks with an example arrangement of brush seal locations. Similar to the example configuration in FIG. 5, the brush seals 630, 632 are located between tracks 602, 604. In addition, FIG. 6A includes a brush seal 634 for axial leakage, which prevents air leakage from an end of the tracks 602, 604. The brush seal 634 for axial leakage seals gaps located at the end of the tracks 602, 604. In some examples, the thrust reverser 224, shown in FIG. 2, includes both the brush seals 630, 632 and the brush seal 634 for axial leakage. In other examples, the thrust reverser 224, shown in FIG. 2, includes at least one brush seal 630, 632 and/or the brush seal 634 for axial leakage.

Figure 6B:
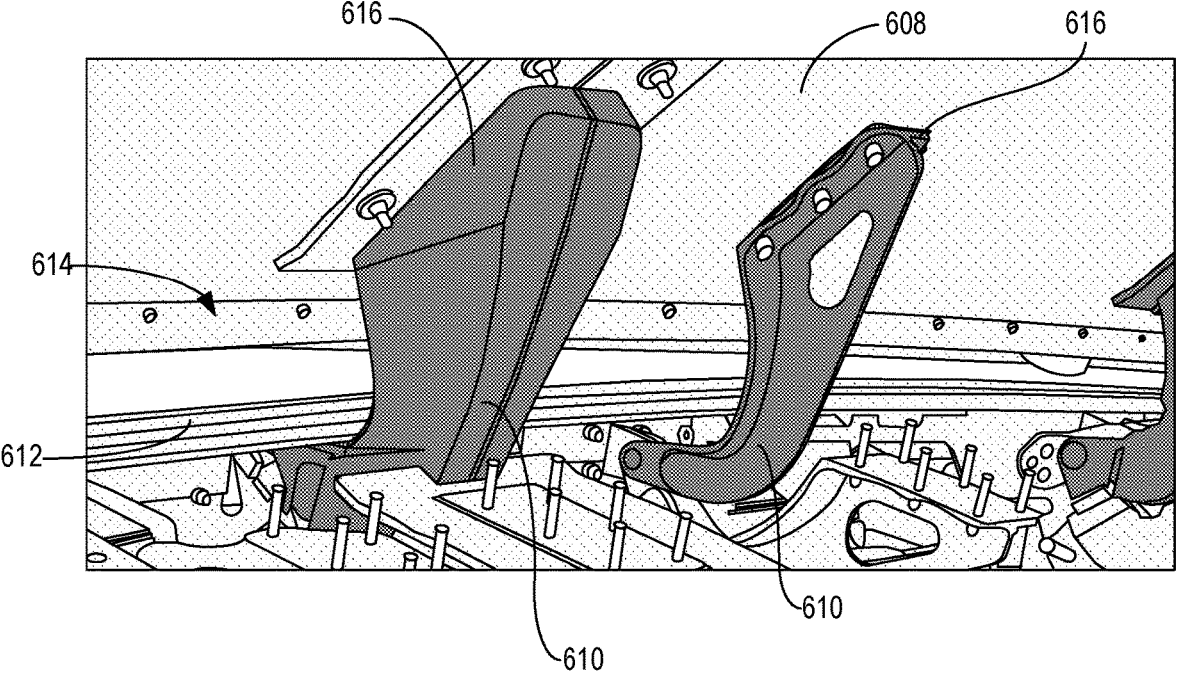
FIG. 6B illustrates example hinges located on an example forward core cowl, according to one or more examples shown and described herein.
Figures 10, 11, 12:
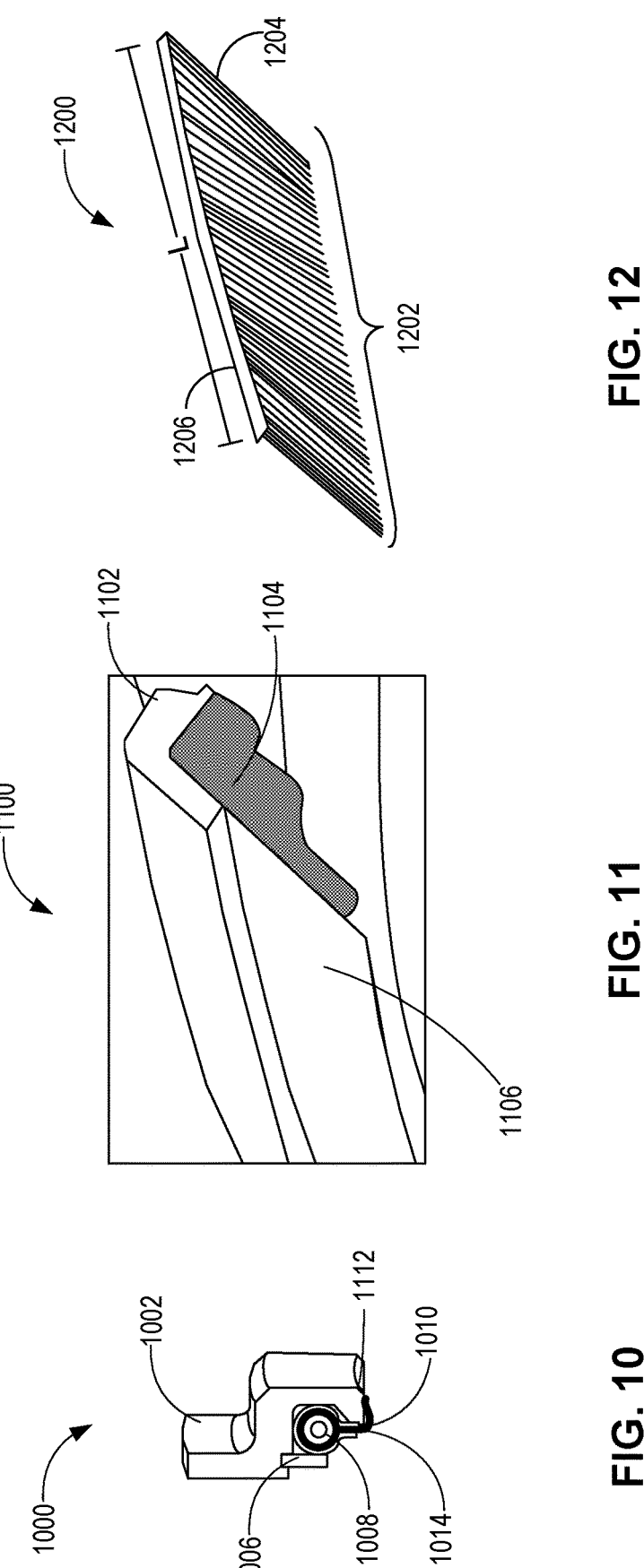
FIG. 10 illustrates a cross-sectional view an example brush seal holder with an example brush seal, according to one or more examples shown and described herein.
FIG. 11 illustrates another example brush seal holder with an example brush seal, according to one or more examples shown and described herein.
FIG. 12 illustrates an example brush with example bristles, according to one or more examples shown and described herein.

FIG. 6B illustrates example hinges 610 located on an example forward core cowl 608. In some examples, the example forward core cowl 608 corresponds to the first nacelle section 212. In some instances, the hinges 610 are referred to as clasps. In some examples, the hinges 610 are implemented to mate two C-ducts as illustrated in FIG. 2 by the first nacelle section 212 and the forward core cowl 210. In other words, the example hinges 610 are implemented to hold together two C-duct sections creating a first seal landing 612 and a second seal landing 614. Typically, when the two C-duct sections are mated, air leakage occurs between the two sections. In some examples, the air leakage is caused by expanding materials on the C-duct or wear on the C-ducts over time. In some instances, the brush seals 1200, shown in FIG. 12, are implemented on the first seal landing 612 and/or the second seal landing 614 to prevent the air flow leakage. In some examples, the example forward core cowl 608 includes a single example hinge 610. In other examples, the example forward core cowl 608 includes a plurality of the example hinges 610. In some examples, the brush seals 1200 are located around a hinge end 616 where the example hinges 610 are connected to the forward core cowl 608. In some examples, the hinges 610 are implemented in D-duct casing styles.

Figure 7:
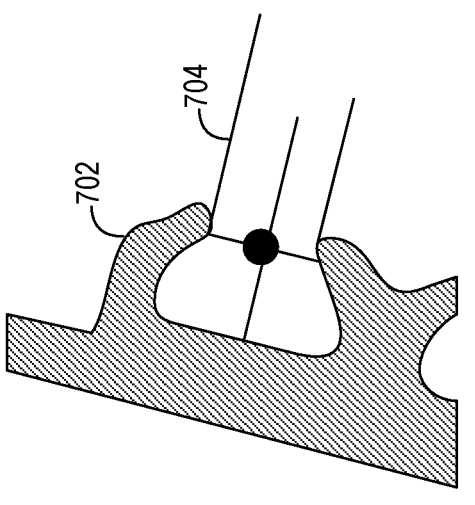
FIG. 7 illustrates a track and a slider.

FIG. 7 illustrates a track and slider. As shown in FIG. 7, a track 702 may be implemented on the thrust reverser 224, shown in FIG. 2, or the core cowl 208, shown in FIG. 2. In FIG. 7, a slider 704 is illustrated that slides along the track 702. For example, the thrust reverser 224, shown in FIG. 2, including the track 702 deploys by translating the core cowl 208, shown in FIG. 2, including the slider 704 by sliding (e.g., moving, translating, etc.) the slider 704 along the track 702. Gaps around the track 702 and the slider 704 create airflow leakage when the reverser is in the closed (e.g., stowed) position. Due to the airflow leakage and lack of sealing, the turbofan 100 experiences performance penalties.

Figure 8:
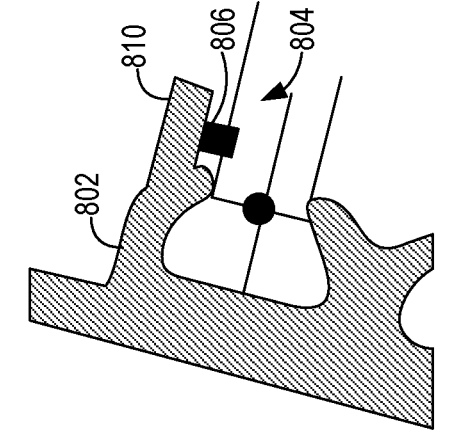
FIG. 8 illustrates an example track and slider with an example arrangement of a brush seal locations, according to one or more examples shown and described herein.

FIG. 8 illustrates an example track 802 and a slider 804 with an example arrangement of a brush seal 806. In FIG. 8, a brush seal holder 810 (e.g., brush seal runner) holds the brush seal 806 to close (e.g., seal) the gap created between the track 802 and the slider 804. The track 802, as shown in FIG. 8, may be implemented on the thrust reverser 224, shown in FIG. 2, or the core cowl 208, shown in FIG. 2. In FIG. 8, the slider 804 slides (e.g., moves, translates, etc.) along the track 802. For example, the thrust reverser 224, shown in FIG. 2, moves from an open position to a closed position by translating the core cowl 208, shown in FIG. 2, including the slider 804, by sliding the slider 804 along the track 802. The brush seal holder 810 and the brush seal 806 create a seal between the brush seal 806 and the slider 804. In some examples, operating loads (e.g., wind-up loads, steady-state fatigue or limit loads, thermal growth of components, etc.) of the turbofan 100, shown in FIG. 1, cause non-uniform spacing and/or connection between hardware and/or movable components (e.g., tracks and sliders and/or pivot doors) and air leakage 416 paths of example of FIG. 4A. In some examples, brush seals 806 are included in the non-uniform spacing and/or connection between the hardware. In some examples, the brush seal 806 is compressed and/or deformed to seal the non-uniform and/or airflow leakage paths between the track 802 and the slider 804. For example, in some instances, the brush seal 806 allows relative motion and provides sealing to prevent performance loss caused by airflow leakage. In some instances, the brush seal 806 is located within the bypass flow path 332, shown in FIG. 3C, and/or outside the flow path. However, in certain examples, the brush seal 806 is located outside the flow path because brush seals 806 located within the flow path can cause excess drag.

Figure 9:
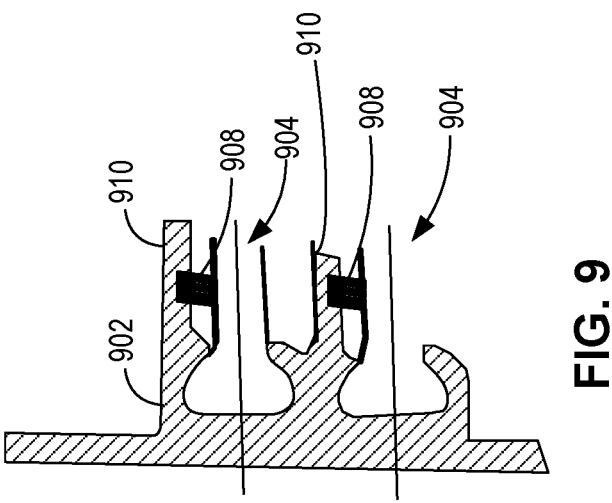
FIG. 9 illustrates example tracks and sliders with an example arrangement of brush seal locations, according to one or more examples shown and described herein.

FIG. 9 illustrates example tracks 902 and sliders 904 with an example arrangement of brush seals 908. FIG. 9 illustrates an example arrangement including more than one track 902 and more than one brush seal 908. In FIG. 9, a brush seal holder 910 (e.g., brush seal runner) holds the brush seals 908 to close gaps created between the tracks 902 and the sliders 904. The tracks 902, as shown in FIG. 9, may be implemented on the thrust reverser 224, shown in FIG. 2, or the core cowl 208, shown in FIG. 2. In FIG. 9, the sliders 904 slide along the tracks 902. For example, the thrust reverser 224, shown in FIG. 2, including the tracks 902, deploys by translating the core cowl 208, shown in FIG. 2, including the sliders 904, by sliding the sliders 904 along tracks 902. In some instances, the brush seal holders 910 and the brush seals 908 create a seal between the brush seals 908 and sliders 904. In some examples, the operating loads (e.g., wind-up loads, steady-state fatigue or limit loads, thermal growth of components, etc.) of the turbofan 100, shown in FIG. 1, cause non-uniform spacing and/or connection between hardware and/or movable components (e.g., tracks and sliders and/or pivot doors), which opens airflow leakage paths. In some examples, the brush seal 908 is compressed and/or deformed to seal the non-uniform and/or airflow leakage paths between the tracks 902 and the sliders 904. In some instances, the brush seals 908 allow relative motion and still provide sealing to prevent performance loss caused by airflow leakage. In some instances, the brush seals 908 are located within the flow path and/or outside the bypass flow path 332, shown in FIG. 3C.

FIG. 10 illustrates a cross-sectional view of an example brush seal holder assembly 1000 with an example brush seal 1010. In FIG. 10, the example brush seal 1010 is enclosed within a brush seal casing 1008. In some examples, the brush seal casing 1008 is cylindrical including an opening 1014 from which the brush seal 1010 protrudes. In some examples, the brush seal casing 1008 is metal. In other instances, the brush seal casing 1008 is plastic. In FIG. 10, a brush seal holder 1002 includes a plate 1006 to support the brush seal casing 1008 and prevent movement during operation of the turbofan 100, as shown in FIG. 1. In some instances, the brush seal holder 1002 includes a backplate 1112 which prevents the brush seal 1010 and the brush seal casing 1008 from moving (e.g., shifting) during operation of the turbofan 100, shown in FIG. 1. The example brush seal holder assembly 1000 provides securement of the brush seal 1010 within the brush seal casing 1008 by wrapping the brush seal 1010 around the brush seal casing 1008, thereby preventing the brush seal 1010 from becoming loose. In some examples, the brush seal holder 1002, the plate 1006, and the backplate 1112 include at least one of nickel alloy, cobalt alloy, stainless steel, plastic, silicone or rubber. In some examples, the silicone and rubber are more advantageous than metal and plastic due to the compressibility characteristics of silicone and rubber. For example, during operation of the turbofan 100 shown in FIG. 1, the gaps may expand or contract due to the temperature changes. As such, the compressibility of the silicone and rubber allows the brush seal 1010 to adapt to the changing gap sizes.

FIG. 11 illustrates another example brush seal holder assembly 1100. FIG. 11 shows an example brush seal holder 1102 along with an example backplate 1104 that holds an example brush seal 1106. In some examples, the brush seal holder 1102 and the backplate 1104 are pressed together with the brush seal 1106 placed in between. The example brush seal holder assembly 1100 is an alternative configuration to the example brush seal holder assembly 1000. For example, the brush seal holder assembly 1100 adds less additional weight to the turbofan 100 than using the example brush seal holder assembly 1000. Additionally, the example brush seal holder assembly 1100 provides a less secure hold for the brush seal 1106 because the pressure hold between the brush seal holder 1102 and the backplate 1104 can loosen overtime. In contrast, the example brush seal holder assembly 1000, as shown in FIG. 10, secures the brush seal 1010 through the turbulence of the turbofan operation due to the brush seal casing 1008. In some examples, the example brush seal holder 1102 of FIG. 11 is composed of at least one of metal, plastic, silicone or rubber. In some examples, the backplate 1104 is composed of at least one of nickel alloy, cobalt alloy, stainless steel, plastic, silicone or rubber.

FIG. 12 illustrates an example brush seal 1200. The example brush seal 1200 includes a plurality 1202 of bristles 1204. In some examples, the bristles 1204 are formed of at least one of plastic, metal, silicone, fiber, etc. In some instances, the brush seal 1200 includes a strip 1206 in which the plurality 1202 of the bristles 1204 are connected (e.g., secured, fastened, etc.). In some examples, the bristle 1204 length ranges from 0.1 inch to 1.0 inch. In some examples, the length of the plurality 1202 of the bristles 1204 varies across the length of the brush seal 1200. In some examples, longer bristles are more advantageous because the gaps (allowing the air leakage 416 of FIG. 4A) is wider in some scenarios. In other examples, the gap is small and thus shorter bristles 1204 are more advantageous. In some examples, the gap size varies. As such, it is beneficial to vary the length the bristles 1204 throughout the brush seal 1200. In some examples, the length of the plurality 1202 of the bristles 1204 is approximately equal throughout the brush seal 1200. In some examples, the plurality 1202 of the bristles 1204 includes a density range of 10 to 10000 bristles per a square inch of the strip's 1206 surface area. For example, the greater density of the bristles 1204 are implemented in locations at which pressure within the nacelle 102 (shown in FIG. 1), for example, is much greater as compared to the ambient pressure outside the nacelle 102. Further, as the density of the bristles 1204 increases, the prevention of air leakage also increases. However, as the density of the bristles 1204 increases, the weight of the brush seal 1200 increases. In instances where the weight of the turbofan 100 (shown in FIG. 1) is a concern, the density of the bristles 1204 is lower. Moreover, the larger the thickness of the bristles 1204, the smaller the air leakage 416 (shown in FIG. 4A) amongst the gaps, and the better the sealing performance.

In FIG. 12, the brush seal 1200 includes a length L in a range from 1 inch to 1000 inches. In some examples, the length L of the brush seal 1200 partially covers a perimeter of a D-Duct. A D-duct is defined herein as the traditional two-piece "D" shaped door assembly that, in some examples, are hinged to open like a clam shell. The brush seals 1200 can be implemented in the D-duct where a first "D" shaped door and a second "D" shaped door are hinged (e.g., clasped) together. If seals are not implemented at the hinge location, air leakage commonly occurs through gaps at locations where the first "D" shaped door and the second "D" shaped door are hinged together. In other examples, the length L of the brush seal 1200 completely covers the perimeter of the D-Duct. In some examples, the length L varies among an O-duct. The O-duct is defined herein as a one-piece "O" shaped duct composite. The brush seals 1200 can be implemented in the O-duct where the front portion of the O-Duct mates with the first nacelle section 212 shown in FIG. 2. In some instances, the length L varies among a C-Duct. The C-Duct is defined herein as a one-piece "C" shaped duct composite. For example, the forward core cowl 306, shown in FIG. 3, is an example C-Duct. In some examples, the brush seal 1200 has improved durability because the plurality 1202 of bristles 1204 can be compressed and/or deformed from an original position to a second position during operation of the turbofan 100, shown in FIG. 1, and the bristles 1204 may return to the original position when the turbofan 100 is not in operation. Furthermore, in some examples, the plurality 1202 of the bristles 1204 can be in a compressed and/or deformed state from the closed position of the thrust reverser 224 to an open position, decompressed state, of the thrust reverser 224, shown in FIG. 2. For example, bristles 1204 comprised of plastic, silicone and/or rubber enable the brush seal 1200 to compress and/or deform. In some examples, the thickness of the bristles 1204 enables the brush seal 1200 to compress and/or deform. For example, the thinner the bristle 1204 the more flexible the bristle 1204 is and enables the brush seal 1200 to compress and/or deform.

As shown in FIG. 12, the example brush seal 1200 may be implemented in a nacelle and/or a thrust reverser architecture. For example, the brush seal 1200 may be implemented in D-duct thrust reversers, O-duct thrust reversers, and C-duct thrust reversers, described above. Further, the example brush seal 1200 may be implemented in translating thrust reversers which include a translating sleeve, such as the core cowl 208 shown in FIG. 2. In some examples, the brush seal 1200 is implemented in rotating thrust reverser which is also referred to as a target, pivot, or clamshell thrust reverser. The pivot door thrust reverser, in some examples, is defined as a thrust reverser including a plurality of pivot doors movable relative to the fan section 226 (FIG. 2) between a closed and open position. In some examples, the brush seal 1200 is implemented in gaps between the pivot doors and the nacelle. The clamshell thrust reverser is defined herein as rotating doors that rotate to uncover reverser ducts and close the normal exhaust exist. For example, the normal exhaust exit may be the bypass airflow passage 1340 (shown in FIG. 13). In some examples, the brush seal 1200 is implemented around the rotating doors of the clamshell reverser. In some instances, the brush seal 1200 is implemented in a cascade thrust reverser. The cascade thrust reverser defined herein is a reverse thrust system including a radially arranged opening located on the nacelle 102 with cascade vanes which are uncovered by a sleeve that slides between an open and closed position. In some examples, blocker doors are included within the nacelle 102 to provide mechanical blockage by placing an obstruction in the exhaust air stream. In some examples, the brush seal 1200 is implemented in gaps between sliders and tracks used to uncover the cascade vanes on the cascade thrust reverser. One example of the cascade thrust reverser is a doorless reverser. As defined herein, the doorless reverser is the cascade thrust reverser which does not include blocker doors. In some examples, the brush seal 1200 is implemented in the doorless reverser.

Furthermore, the example brush seal 1200 may be implemented in nacelles of various gas turbine architecture (e.g., ducted, non-ducted, open fan, etc.). In some examples, the brush seal 1200 can be installed to prevent airflow leakage from a bypass stream through an outer casing 1308 described in FIG. 13. In some instances, the brush seal 1200 can be installed to prevent airflow leakage from the bypass stream to the thrust reverser cavity 120 and/or pressure shelf, as shown in FIG. 1. In some examples, the brush seal 1200 can be installed to prevent airflow leakage from the bypass stream to ambient conditions described in FIG. 13 below.

Figure 13:
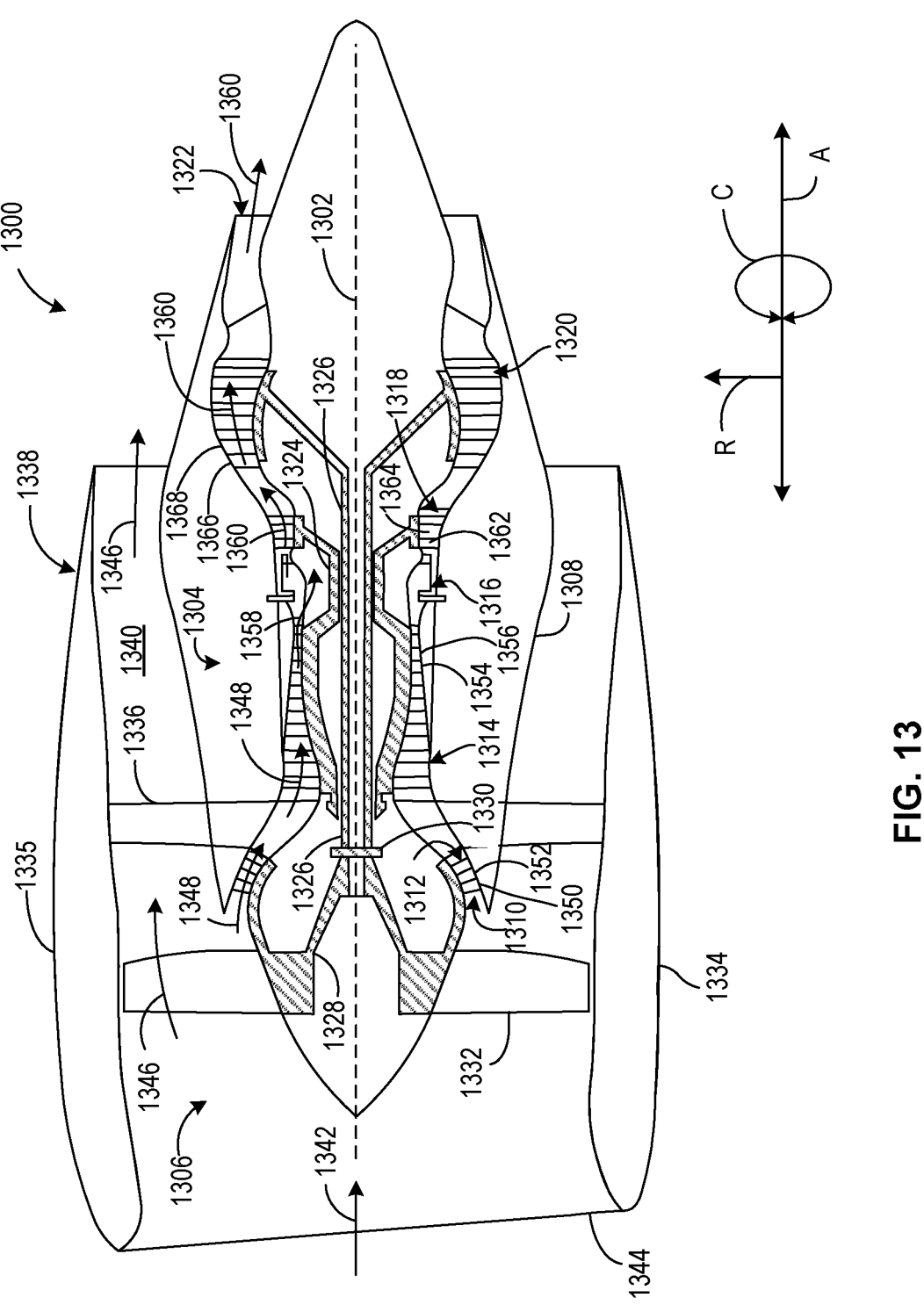
FIG. 13 is a schematic cross-sectional view of an example high-bypass turbofan-type gas turbine engine, according to one or more examples shown and described herein.

FIG. 13 is a schematic cross-sectional view of an example high-bypass turbofan-type gas turbine engine 1300 ("turbofan 1300") as may incorporate various examples disclosed herein. As shown in FIG. 13, the turbofan 1300 defines a longitudinal or axial centerline axis 1302 extending therethrough for reference. In general, the turbofan 1300 can include a core turbine or gas turbine engine 1304 disposed downstream from a fan section 1306.

The core turbine 1304 can generally include a substantially tubular outer casing 1308 that defines an annular inlet 1310. The outer casing 1308 can be formed from a single casing or multiple casings. In some examples, the brush seals 1200 (shown in FIG. 12) are implemented on and/or within the outer casing 1308 to prevent air leakage. The outer casing 1308 encloses, in serial flow relationship, a compressor section having a booster or low-pressure compressor 1312 ("LP compressor 1312") and a high-pressure compressor 1314 ("HP compressor 1314"), a combustion section 1316, a turbine section having a high-pressure turbine 1318 ("HP turbine 1318") and a low-pressure turbine 1320 ("LP turbine 1320"), and an exhaust section 1322. A high-pressure shaft or spool 1324 ("HP shaft 1324") drivingly couples the HP turbine 1318 and the HP compressor 1314. A low-pressure shaft or spool 1326 ("LP shaft 1326") drivingly couples the LP turbine 1320 and the LP compressor 1312. The LP shaft 1326 can also couple to a fan shaft or spool 1328 of the fan section 1306. In some examples, the LP shaft 1326 can couple directly to the fan shaft 1328 (i.e., a direct-drive configuration). In alternative configurations, the LP shaft 1326 may couple to the fan shaft 1328 via a reduction gear 1330 (i.e., an indirect-drive or geared-drive configuration).

As shown in FIG. 13, the fan section 1306 includes a plurality of fan blades 1332 coupled to and extending radially outwardly from the fan shaft 1328. A nacelle 1334 circumferentially encloses the fan section 1306 and/or at least a portion of the core turbine 1304. The nacelles 1334 can be supported relative to the core turbine 1304 by a plurality of circumferentially-spaced-apart outlet guide vanes 1336. Furthermore, a downstream section 1338 of the nacelle 1334 can enclose an outer portion of the core turbine 1304 to define a bypass airflow passage 1340 therebetween. Additionally, outside the nacelle 1334 defines ambient pressure conditions. Furthermore, the brush seals 1200, shown in FIG. 12, may be implemented in the nacelle 1334 to prevent air from escaping the bypass airflow passage 1340 to ambient conditions.

As illustrated in FIG. 13, air 1342 enters an intake or inlet portion 1344 of the turbofan 1300 during operation thereof. A first portion 1346 of the air 1342 flows into the bypass airflow passage 1340, while a second portion 1348 of the air 1342 flows into the inlet 1310 of the LP compressor 1312.

One or more sequential stages of LP compressor stator vanes 1350 and LP compressor rotor blades 1352 coupled to the LP shaft 1326 progressively compress the second portion 1348 of the air 1342 flowing through the LP compressor 1312 en route to the HP compressor 1314. Next, one or more sequential stages of HP compressor stator vanes 1354 and HP compressor rotor blades 1356 coupled to the HP shaft 1324 further compress the second portion 1348 of the air 1342 flowing through the HP compressor 1314. This provides compressed air 1358 to the combustion section 1316 where it mixes with fuel and burns to provide combustion gases 1360. In some examples, the brush seals 1200, shown in FIG. 12, may be implemented throughout the path of the second portion 1348 of the air 1342 to prevent air leakage from the high pressure core turbine 1304 to the bypass airflow passage 1340 of lower pressure.

The combustion gases 1360 flow through the HP turbine 1318 where one or more sequential stages of HP turbine stator vanes 1362 and HP turbine rotor blades 1364 coupled to the HP shaft 1324 extract a first portion of kinetic and/or thermal energy therefrom. This energy extraction supports operation of the HP compressor 1314. The combustion gases 1360 then flow through the LP turbine 1320 where one or more sequential stages of LP turbine stator vanes 1366 and LP turbine rotor blades 1368 coupled to the LP shaft 1326 extract a second portion of thermal and/or kinetic energy therefrom. This energy extraction causes the LP shaft 1326 to rotate, thereby supporting operation of the LP compressor 1312 and/or rotation of the fan shaft 1328. The combustion gases 1360 then exit the core turbine 1304 through the exhaust section 1322 thereof.

Along with the turbofan 1300, the core turbine 1304 serves a similar purpose and sees a similar environment in land-based gas turbines, turbojet engines in which the ratio of the first portion 1346 of the air 1342 to the second portion 1348 of the air 1342 is less than that of a turbofan, and unducted fan engines in which the fan section 1306 is devoid of the nacelle 1334. In each of the turbofan, turbojet, and unducted engines, a speed reduction device (e.g., the reduction gearbox 1330) can be included between any shafts and spools. For example, the reduction gearbox 1330 can be disposed between the LP shaft 1326 and the fan shaft 1328 of the fan section 1306.

From the foregoing, it will be appreciated that example apparatuses have been disclosed that prevent air leakage using brush seals in turbine nacelles. Disclosed apparatus improve the efficiency of turbine engines by preventing airflow leakage through the casings and tracks, which improves performance of turbine engines and other engines. Disclosed apparatus are accordingly directed to one or more improvement(s) in the operation of a machine and/or mechanical device.

Example methods, apparatus, systems, and articles of manufacture to prevent air leakage in turbine engines are disclosed herein. Further aspects of the present disclosure are provided by the subject matter of the following clauses.

A turbofan comprising a bifurcation including a first track; and an outer casing including an airflow inlet and an airflow outlet, the outer casing adjustable into a closed position and an open position, the outer casing positioned around the bifurcation, the outer casing including a first slider for movement between the closed position and the open position that mates with a first track, the first track including a brush seal holder and a brush seal including a plurality of bristles having a compressed state in the closed position and a decompressed state in the open position.

The turbofan of any preceding clause, wherein the brush seal is positioned radially outward of the first track.

The turbofan of any preceding clause, wherein the brush seal is located between the first track and the first slider.

The turbofan of any preceding clause, wherein the brush seal is at an end of the first track.

The turbofan of any preceding clause, further including a forward core cowl includes a hinge, and wherein the brush seal is within at least one of the first track or the hinge.

The turbofan of any preceding clause, wherein the brush seal includes at least one of nickel alloy, cobalt alloy, stainless steel, plastic, silicone, rubber, plastic, silicone, or fiber.

The turbofan of any preceding clause, wherein the plurality of bristles has a length range from example 0 includes 1 inch to 1 inch.

The turbofan of any preceding clause, wherein the plurality of bristles has a density range from 10 to 1000 bristles per a square inch of a strip surface area.

The turbofan of any preceding clause, wherein the core cowl is movable via the slider along the track of the outer casing and includes at least one brush seal.

The turbofan of any preceding clause, further including at least one of a bulb seal, a P seal, a labyrinth seal, or a compression seal.

The turbofan of any preceding clause, wherein the brush seal includes a length 'L' in a range from 1 to 1000 inches.

The turbofan of any preceding clause, wherein the brush seal holder includes a cylindrical brush seal casing having an opening to receive the brush seal, further including a plate to support and prevent movement of the brush seal casing.

The turbofan of any preceding clause, wherein the brush seal holder includes a backplate pressed against the brush seal holder, the brush seal located between the brush seal holder and the backplate.

The turbofan of any preceding clause, wherein a forward core cowl includes a first C-duct and a second C-duct, a hinge mates the first C-duct and the second C-duct, forming a first seal landing and a second seal landing including the brush seal extending along at least a portion of the first and second seal landing.

An outer duct of a turbine engine, the outer duct comprising: a first outer duct section including an airflow inlet; a second outer duct section including an airflow outlet, having a closed position and an open position, the outer duct longitudinally movable from the closed position to the open position, the second outer duct including: a slider that is received by a track to facilitate movement of the second outer duct from the closed position to the open position; and a brush seal holder and a brush seal including a plurality of bristles having a compressed state in the closed position and a decompressed state in the open position.

The outer duct of any preceding clause, wherein the brush seal is positioned radially outward of the track.

The outer duct of any preceding clause, wherein the brush seal is in between the track and the slider.

The outer duct of any preceding clause, wherein the brush seal is at an end of the track.

The outer duct of any preceding clause, further including a bifurcation including the track.

The outer duct of any preceding clause, wherein the brush seal includes at least one of nickel alloy, cobalt alloy, stainless steel, plastic, silicone, rubber, plastic, silicone, or fiber.

The outer duct of any preceding clause, further including at least one of a bulb seal, a P seal, a labyrinth seal, or a compression seal.

A turbofan comprising a core cowl, and a nacelle having an airflow inlet and an airflow outlet, the nacelle including: a first nacelle section including a first perimeter, a second nacelle section, including a second perimeter, having a closed position and an open position, the second nacelle section longitudinally movable from the closed position to the open position, and a brush seal runner extending along at least a portion of the first perimeter and at least a portion of the second perimeter, the brush seal runner including a first brush seal including a plurality of bristles having a compressed state in the closed position and a decompressed state in the open position.

The turbofan of any preceding clause, further including a core cowl including a second brush seal with a plurality of bristles.

The turbofan of any preceding clause, wherein the first brush seal includes at least one of nickel alloy, cobalt alloy, stainless steel, plastic, silicone, rubber, plastic, silicone, or fiber.

The turbofan of any preceding clause, wherein the second nacelle section includes a first O-ring at a first end, the first end to mate with the first nacelle section in the closed position, the first brush seal extending the portion of the second perimeter including at least the first O-ring.

The turbofan of any preceding clause, wherein the second nacelle section includes tracks to facilitate the second nacelle section from the closed to the open position, the first brush seal extending the portion of the second perimeter including at least the tracks.

The turbofan of any preceding clause, wherein the core cowl includes a second O-ring at a first end, the first end to mate with a fan section of the turbofan, the second brush seal encompasses at least the second O-ring.

The turbofan of any preceding clause, wherein the core cowl includes sliders to facilitate the second nacelle section from the closed to the open position, the second brush seal extending a portion of the sliders.

The turbofan of any preceding clause, further including a forward core cowl including a third brush seal with a plurality of bristles extending along at least a portion of the edge of the forward core cowl.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A turbofan comprising:

a bifurcation including a first track;

an outer casing including an airflow inlet and an airflow outlet, the outer casing adjustable into a closed position and an open position, the outer casing positioned around the bifurcation, the outer casing including a first slider for movement between the closed position and the open position that mates with a first track, the first track including a brush seal holder and a brush seal including a plurality of bristles having a compressed state in the closed position and a decompressed state in the open position; and a forward core cowl including a hinge, wherein the brush seal is within at least one of the first track or the hinge.

2. The turbofan of claim 1, wherein the brush seal is positioned radially outward of the first track.

3. The turbofan of claim 1, wherein the brush seal is located between the first track and the first slider.

4. The turbofan of claim 1, wherein the brush seal is at an end of the first track.

5. The turbofan of claim 1, wherein the brush seal includes at least one of nickel alloy, cobalt alloy, stainless steel, rubber, plastic, silicone, or fiber.

6. The turbofan of claim 1, wherein the plurality of bristles has a length range from 0.1 inch to 1 inch.

7. The turbofan of claim 1, wherein the plurality of bristles has a density range from 10 to 1000 bristles per a square inch of a strip surface area.

8. The turbofan of claim 1, wherein a core cowl is movable via a second slider along a second track of the bifurcation and includes at least one brush seal.

9. The turbofan of claim 1, further including at least one of a bulb seal, a P-seal, a labyrinth seal, or a compression seal.

10. An outer duct of a turbine engine, the outer duct comprising:

a forward core cowl including a hinge;

a first outer duct section including an airflow inlet;

a second outer duct section including an airflow outlet, having a closed position and an open position, the outer duct longitudinally movable from the closed position to the open position, the second outer duct section including:

a slider that is received by a track to facilitate movement of the second outer duct section from the closed position to the open position; and a brush seal holder and a brush seal including a plurality of bristles having a compressed state in the closed position and a decompressed state in the open position, wherein the brush seal is within at least one of the track or the hinge.

11. The outer duct of claim 10, wherein the brush seal is positioned radially outward of the track.

12. The outer duct of claim 10, wherein the brush seal is in between the track and the slider.

13. The outer duct of claim 10, wherein the brush seal is at an end of the track.

14. The outer duct of claim 10, further including a bifurcation including the track.

15. The outer duct of claim 10, wherein the brush seal includes at least one of nickel alloy, cobalt alloy, stainless steel, rubber, plastic, silicone, or fiber.

16. The outer duct of claim 11, further including at least one of a bulb seal, a P-seal, a labyrinth seal, or a compression seal.

17. A turbofan comprising:

a core cowl; and a nacelle having an airflow inlet and an airflow outlet, the nacelle including:

a forward core cowl including a hinge;

a first nacelle section including a first perimeter and a first track;

a second nacelle section, including a second perimeter, having a closed position and an open position, the second nacelle section longitudinally movable from the closed position to the open position along the first track; and a brush seal runner extending along at least a portion of the first perimeter and at least a portion of the second perimeter, the brush seal runner including a first brush seal including a plurality of bristles having a compressed state in the closed position and a decompressed state in the open position, wherein the first brush seal is within at least one of the first track or the hinge.

18. The turbofan of claim 17, wherein the core cowl further includes a second brush seal with a plurality of bristles.

19. The turbofan of claim 17, wherein the first brush seal includes at least one of nickel alloy, cobalt alloy, stainless steel, rubber, plastic, silicone, or fiber.

20. A turbofan comprising:

a bifurcation including a first track and a second track; and an outer casing including an airflow inlet and an airflow outlet, the outer casing adjustable into a closed position and an open position, the outer casing positioned around the bifurcation, the outer casing including a first slider for movement between the closed position and the open position that mates with a first track, the first track including a brush seal holder and a first brush seal including a plurality of bristles having a compressed state in the closed position and a decompressed state in the open position;

wherein a core cowl is movable via a second slider along the second track of the bifurcation and includes a second brush seal.

\* \* \* \* \*